US005564070A

United States Patent [19]
Want et al.

[11] Patent Number: 5,564,070
[45] Date of Patent: Oct. 8, 1996

[54] METHOD AND SYSTEM FOR MAINTAINING PROCESSING CONTINUITY TO MOBILE COMPUTERS IN A WIRELESS NETWORK

[75] Inventors: Roy Want, Mountain View; Norman I. Adams, Sunnyvale; Richard J. Goldstein, San Francisco; William N. Schilit, Palo Alto, all of Calif.; Michael M. Tso, Beaverton, Oreg.

[73] Assignee: Xerox Corporation, Stamford, Conn.

[21] Appl. No.: 100,655

[22] Filed: Jul. 30, 1993

[51] Int. Cl.$^6$ .................................................. H04B 1/00
[52] U.S. Cl. ................... 455/53.1; 370/95.1; 370/85.13; 379/59
[58] Field of Search .................................. 455/53.1, 54.1, 455/54.2, 56.1, 66; 370/85.13, 95.1, 95.3, 94.3, 85.2; 340/825.31, 825.34; 379/59, 58

[56] References Cited

U.S. PATENT DOCUMENTS

| 5,159,592 | 10/1992 | Perkins | 370/85.7 |
|---|---|---|---|
| 5,181,200 | 1/1993 | Harrison | 370/85.1 |
| 5,210,753 | 5/1993 | Natarajan | 370/95.1 |
| 5,212,806 | 5/1993 | Natarajan | 455/33.2 |
| 5,241,542 | 8/1993 | Natarajan et al. | 455/54.1 |

FOREIGN PATENT DOCUMENTS

| 0483547A1 | 10/1990 | European Pat. Off. . |
|---|---|---|
| 0483551A2 | 10/1990 | European Pat. Off. . |
| WO9219059 | 10/1992 | WIPO . |

OTHER PUBLICATIONS

Pankike–Babatz, U. "1984/1988 X.400 Recommendations–User Requirements". Computer Communications, vol. 13, No. 10, Dec. 1990, Guildford, GB. pp. 595–610.

Ioannidis, J.; Duchamp, D.; Maguire, Jr., G. Q. IP–Based Protocols For Mobile Internetworking. ACM, 1991, pp. 235–245.

Ioannidis, J.; Maguire, Jr., G. Q. The Design and Implementation of a Mobile Internetworking Architecture. Winter USENIX, Jan. 25–29, 1993. San Diego, CA. pp. 491–502.

Milligan, T. The Integrated Interactive Intermedia Facility Design Report–Cavecat Revision 1.2.2 May 1992. pp. 1–23.

Teraoka, F.; Yokote, Y.; Tokoro, M. A Network Architecture Providing Host Migration Transparency. ACM. 1991. pp. 209–220.

Ioannidis, J.; Duchamp, D.; Maguire, Jr., G. Q.; Deering, S. Protocols For Supporting Mobile IP Hosts. Mobile IP Working Group Internet–Draft, pp. 1–48, Jun. 1992.

Weiser, M. The Computer for the 21st Century. Scientific American, vol. 265, No. 3. Sep. 1991. pp. 94–104.

Weiser, M. Some Computer Science Issues in Ubiquitous Computing. Communications of the ACM, vol. 36, No. 7, pp. 75–85.

Primary Examiner—Reinhard J. Eisenzopf
Assistant Examiner—Lee Nguyen

[57] ABSTRACT

A system is disclosed for maintaining processing continuity in a network having a network accessible application and an intermittently connected wireless mobile unit. A transceiver is connected to the network for wireless communication with the mobile unit, and a gateway connected to the network is used to control the transceiver. A stationary processor is connected to the gateway and configured to support access to the network accessible application, which can run either on the stationary processor itself or on a remote processor. Use of network accessible applications from the mobile unit is mediated by an agent dedicated to communication and processing control of the mobile unit. The agent runs on the stationary processor and is connected to the gateway for handling communications between the mobile unit and the network accessible application. To ensure processing continuity, the agent is configured to hold data received from the network accessible application for transmission to the mobile unit only when the mobile unit is in wireless communication with the network.

7 Claims, 5 Drawing Sheets

METHOD AND SYSTEM FOR MAINTAINING PROCESSING CONTINUITY TO MOBILE COMPUTERS IN A WIRELESS NETWORK

FIELD OF THE INVENTION

The present invention relates in general to establishing and maintaining connections among various computers and, in particular, to maintaining communication and processing connections to mobile computers in a wireless network.

BACKGROUND OF THE INVENTION

Prior to the advent of computer networks, problems were solved primarily by the brute force of a single processor that churned away until solution, error, or timeout. This early paradigm of computing envisioned that users would voluntarily queue up for stationary computing resources and wait patiently until their processing requests were serviced.

The introduction of computer networks and personal computing forever changed user expectations of what computer systems can accomplish. Individual users would no longer expect to travel to a particular location to have their processing needs met. Instead, individuals would expect that sufficient computing power would be sitting on their desk to get the job done; or, at least, that their personal computers would be networked to sufficient resources remote from their location.

Early forms of personal computing, however, limited the usefulness of this paradigm. One problem was that early personal computers were virtually immovable boxes sitting on individual desks. The static nature of personal computers confined users to one location, focusing their attention upon the box which embodied the computer. This limitation did not allow for a full range of human user interactions. For example, personal computers do not adequately support spontaneous, face-to-face meetings between several people that may occur at various locations throughout the workplace. Although the advent of "portable" personal computers, such as laptops or notebooks, helps facilitate these meetings, several people must still huddle around a common screen display to work collaboratively.

Other attempts were made to improve these personal computers by increasing their "user-friendliness". Windows were developed to give users the illusion of working from one's desktop. This metaphor suffered, however, from the size limitation of the monitor screen available to most personal computers—no one would ever think of using an actual desktop only nine inches high by eleven inches wide. Again, personal computers were static objects commanding the attention of users.

An alternative paradigm to personal computing considers integrating computers, of varying size and power, in large numbers into a typical office environment. The integration of these computers could be achieved "ubiquitously" in such a way that the inhabitants of such an environment would not notice the existence of these computers. In his article, "The Computer for the 21st Century", (Scientific American, September 1991 issue), Dr. Mark Weiser describes a "ubiquitous computing" work place in which there would be literally hundreds of computers per room. These computers would provide a level of functionality that no single personal computer provides today.

In Weiser's work space, this integration forms a hierarchy in terms of size and performance. At the lowest end, "tabs", typically only a few inches square, are the smallest components of ubiquitous computing. Tabs would perform basic functions in a ubiquitous setting. For example, tabs have been used as "active badges" that are worn by people inhabiting this environment. As a wearer of this badge walks from room to room, the badge would communicate to the room, through a wireless medium, the presence of the wearer. Automatically, the room might make adjustments for the individual, such as dimming lights, adjusting room temperature, and the like. Additionally, the building itself could keep account of an individual's movements. Phone calls could be forwarded to the room where the individual is located. Likewise, security doors would open up for a certain individuals and not for others.

At the other end of the hierarchy, "pads" and "boards" are computers analogous to sheets of paper and blackboards respectively. These computers, together with tabs, work interactively with each other to form a seamless web of computing in the work place. Ideally, in any given room, hundreds of tabs may work and communicate with ten or twenty pads and one or two boards.

Tabs that have an active display, as well as pads and boards, may serve to augment the amount of display available to exhibit data. As described in Dr. Weiser's article, a user may be able to migrate any window that may appear on a workstation screen onto a tab, pad or board. The advantages of migrating windows onto tabs, pads or boards are usability and portability. Transporting a window flees up additional space on a screen for other information. Additionally, transported windows on several tabs or pads could be spread across an actual desk top—exactly as people would spread a set of working papers. Carrying a project to another room would be as simple as collecting all the relevant tabs and pads and physically walking.

Although there may be several ways to support a "ubiquitous computing" environment to accommodate the entire range of mobility required for these ubiquitous computers, the preferred implementation is a network that allows "wireless" communication with mobile devices. To date, many "wireless" networks have already been designed—the most notable, perhaps, being the cellular telephone network.

The "area" of a network employing the present invention may vary according to the needs and goals of the intended users. In the context of an office setting, a "local area" network is likely to be sufficient to use as a backbone. It will be appreciated, however, that the principles of the present invention may find application in networks of varying areas.

Some wireless networks have already been designed for the office place. For example, in U.S. Pat. No. 5,210,753 issued to Natarajan on May 11, 1993, entitled "Robust Scheduling Mechanism for Efficient Band-Width Usage in Multicell Wireless Local Networks", Natarajan discloses a method for partitioning transceiver nodes into maximally independent sets of non-interfering nodes for efficient scheduling of transmission.

In U.S. Pat. No. 5,212,806, issued to Natarajan on May 18, 1993, entitled "Distributed Control Methods for Management of Migrating Data Stations in a Wireless Communications Network", Natarajan discloses a method of handing off communication ownership of mobile units as they cross node/cell boundaries.

These above-mentioned patents are generally concerned with the physical layer of the network and, more specifically, with methods of transferring the communication links of a mobile unit from one base station to another. These issues might be better classified as problems in "communication continuity". Communication continuity is concerned primarily with mechanisms for providing a continuous pathway for data between two or more units, at least one such unit being mobile; and once disrupted, how to reestablish a data pathway.

By contrast, "processing continuity" is defined by the goal of maintaining a current and proper processing context between two units. Processing continuity ensures that either potential intermediate results are delivered to the end-user in a timely fashion or that these intermediate results are not generated (e.g. "blocked").

None of the above-mentioned patents disclose a mechanism for providing processing continuity between a mobile unit and a remote host. One of the features of the ubiquitous computing environment is that the mobile unit is ideally small and portable. This feature may necessitate minimal power consumption by the mobile unit and, hence, limited processing capabilities. Thus, a ubiquitous computing unit, such as the tab, may only require a small processor and limited memory sufficient to support communication with distributed applications. To achieve this type of mobile, distributed processing, the network must have sufficient mechanisms to provide not only communication continuity but also processing continuity.

These higher level issues are discussed in another article by Dr. Mark Weiser, entitled "Some Computer Science Issues in Ubiquitous Computing" published in the July 1993 issue of Communications of the ACM. One of the problems identified by Dr. Weiser is the dynamic location updating required when mobile units roam from base station to base station. A number of solutions proposed to this problem involve an additional layer of network addresses. This additional layer may be embodied in the implementation of special routing nodes. Special routing nodes would keep track of the real address of the mobile unit and forward packets addresses to the unit appropriately.

One design issue that arises is whether location information should be centralized or distributed. There are many reasons for selecting one design over the other, such as ease of implementation and system performance. For example, while a centralized database of location information may be easier to implement and manage as a system resource, a centralized database may become a bottleneck degrading system performance. Additionally, other reasons exists, including social ones—the choice between a centralized and a decentralized database may depend on the level of security and privacy desired by the system users.

These design choices have been made in a number of current systems. For example, in U.S. Pat. No. 5,159,592 issued to Perkins on Oct. 27, 1992 and entitled "Network Address Management for a Wired Network Supporting Wireless Communication to a Plurality of Mobile Users", Perkins discloses the use of a global gateway to properly route packets from remote hosts to mobile units. The global gateway maintains a list of "pseudo-addresses" that are used by remote hosts to address mobile units. The global gateway, in turn, relays the packet to the local gateway that is currently managing the mobile unit. If the mobile unit is turned off, the remote host's message is buffered by the global gateway until the unit returns to service. Once in service, the buffered packets are then forwarded to the mobile units.

Likewise, in U.S. Pat. No. 5,181,200, issued to Harrison on Jan. 19, 1993 entitled "Handoff Method and Apparatus for Mobile Wireless Workstation", Harrison describes a store-and-forward method whereby packets intended for a mobile unit that loses connection with the network are stored in a spooler until connection is re-established. Upon restoring connection, the spooled data packets are transmitted to the unit in a "first in—first out" fashion from the spooler. Both Perkins and Harrison employ centralized name services and some form of buffering to effect a measure of continuity in their respective systems.

A decentralized name service, however, may be desirable in a ubiquitous computing environment. In such an environment, mobile units may have several, associated application processes all vying for the attention of the unit. This is especially true for a user's tab which is being used as a Personal Digital Assistant (PDA). As a user roams around such an environment, a user may have access to a number of processes that control certain functions in the environment or that may be supplying the user with requested information. These processes may desire the attention of the user tab to inform the user of their status. As the mobile unit temporarily loses connection to the network, the accessible processes must preserve their status and information until such time that connection is re-established.

A global name service tasked with resolving all the references among these different processes to mobile units might become the bottleneck to reasonable system throughput. This is particularly true if the name service is also tasked with providing authorization access for all processes wishing to communicate with a mobile unit. Otherwise, if the name service allows unlimited access to mobile units, then individual users might lose a degree of security and privacy that is otherwise desirable.

Additionally, mechanisms, other than buffering, may be more advantageous for processing continuity. Buffering is inherently limited to the amount of storage allocated. Likewise, if several processes are attempting to communicate with the mobile unit simultaneously, a scheme to separate and reassemble the buffered packets from the various processes must be implemented.

Thus, there is a need for a mechanism that allows for easy updating of mobile unit locations and the preservation of processing status of communicating applications while, simultaneously, allowing users to control which processes have access to their units.

It is thus an object of the present invention to provide a mechanism that allows processing continuity to mobile units by preserving the status of accessible processes that desire communication with the unit.

It is also another object of the present invention to provide a mechanism for easy updating of a mobile unit's location to facilitate communication between units and their associated processes.

It is yet another object of the present invention to provide a mechanism to allow user discretion in which processes have access to their mobile units.

SUMMARY OF THE INVENTION

In summary, the present invention is a wireless communication system that employs a novel applications interface, namely an "agent", that enables mobile computers to keep in processing continuity with their associated application programs.

Each mobile computer in the workplace environment is assigned at least one agent. The agent operates primarily for the benefit of its assigned computer. For example, agents are responsible for "knowing" the location of their assigned computers. All communications routed to and from a mobile computer goes through its agent. As the mobile computers in the present invention run applications on remote hosts, all communications between the mobile computer and its applications are mediated by its agent.

In addition, agents are responsible for security for mobile computers. Any application requesting communication with the mobile unit must be authorized by the agent. Once communication between a mobile unit and an application is started, other applications wait until they are scheduled to start communications.

One advantage of the present invention is processing continuity. Mobile computers running application programs resident on a remote host will be connected to the mobile unit even though the unit moves from cell to cell.

Another advantage of the present invention is security. Any process or application desiring communication with the mobile unit will need to be cleared by its agent. The agent maintains a list of authorized users or applications.

Another advantage of the present invention is that applications need not "know" that a tab is mobile. Instead, applications communicate with a tab's agent which is always at a fixed network address.

Another advantage of the present invention is that the IR data traffic is kept to a minimum. This is accomplished by allowing only one communicating application access to the tab at a time. Other applications desiring communication must schedule with the tab agent.

Another advantage of the present invention is that the processing requirements of the tab are kept to a minimum. This requirement enable the tab to have a small size and low power consumption. Many of the tab's functions are processed distributively and the results are communicated to the tab one application at a time.

Additional objects and features of the present invention will be more readily apparent from the following detailed description of an exemplary embodiment thereof, as illustrated in the accompanying drawings.

BRIEF DESCRIPTION OF THE DRAWINGS

The purpose and advantages of the present invention will be apparent to those skilled in the art from the following detailed description in conjunction with the drawings.

In FIG. 2A, a user is holding a mobile unit that is running a particular application that is resident on a remote host. In this figure, the application is a "You are here" program, showing the user's location in the workplace. FIG. 2B depicts that as the user has moved to the adjacent room, the user's unit has maintained processing continuity with the remote application. The user's unit is updated upon arriving in the new room.

DETAILED DESCRIPTION OF THE PREFERRED EMBODIMENTS

The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the present invention as defined by the appended claims. Thus, the present invention is not intended to be limited to the embodiment shown, but is to be accorded the widest scope consistent with the principles and features disclosed herein.

Figure 1:
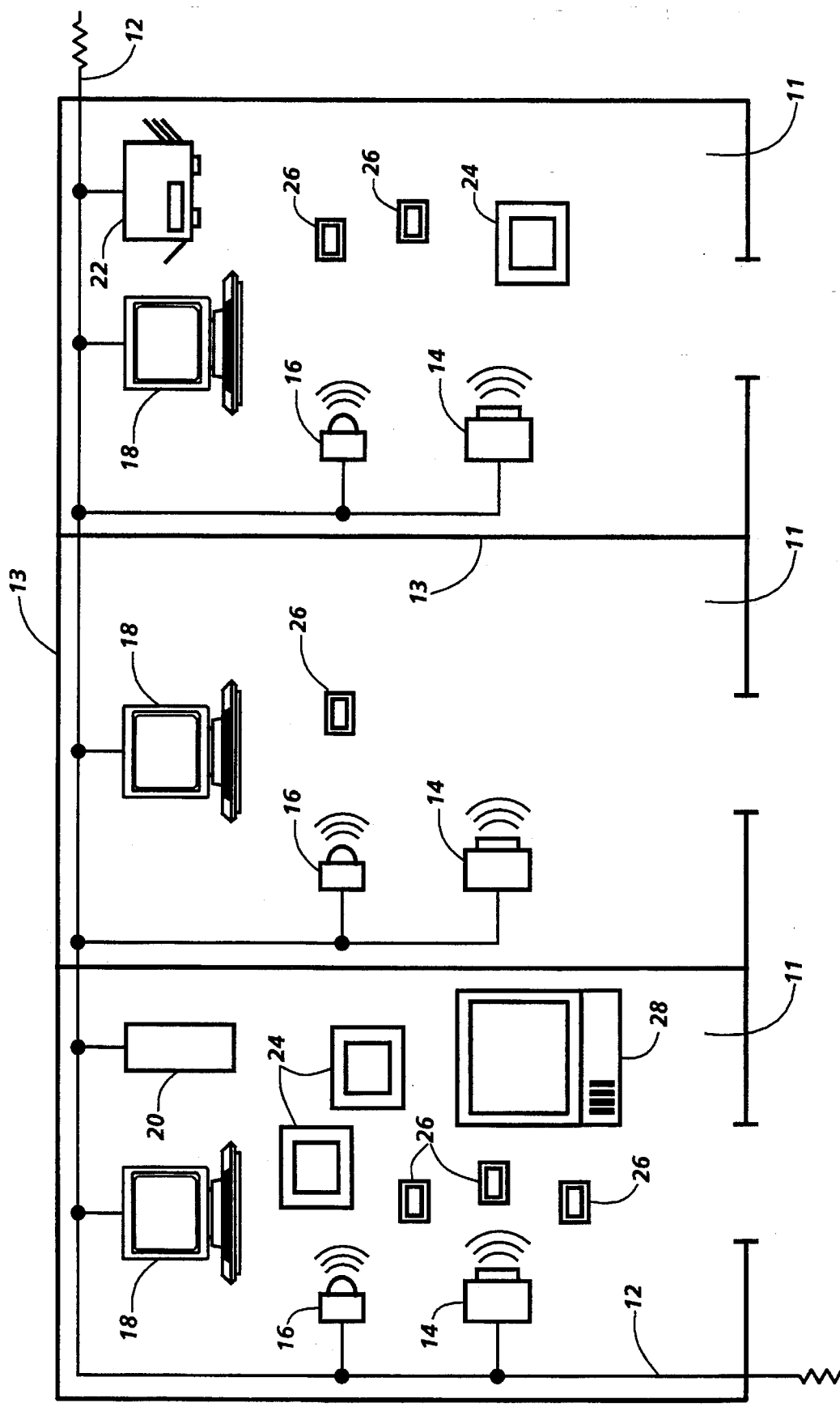
FIG. 1 depicts a ubiquitous computing environment interconnected by a network having wireless connections to mobile units.

Referring to FIG. 1, office 10, as configured, supports a "ubiquitous computing" environment. Components that might be found in such an environment comprise hardwired network backbone 12, radio and infrared transceivers 14 and 16 respectively, workstations 18, file servers 20, printers 22 and various mobile units 24, 26 and 28.

Network backbone 12 provides high bandwidth communications between the various communication and computing devices. In the presently preferred embodiment, a 10 Mbps Ethernet provides the basic infrastructure. It will be appreciated that although any network architecture may suffice for the backbone, it is desirable that the bandwidth be large enough to support a desired maximum number of devices for some predetermined benchmark performance.

Components of this environment may be properly classified as either "stationary" or "mobile". Stationary components are generally hardwired to network backbone 12. Such components comprise user workstations 18, file servers 20 and printers 22, and the like. It will be appreciated that other networkable components may be connected to the infrastructure depending upon the needs of the office.

Mobile communication and computer units connect to backbone 12 via radio and infrared transceivers 14 and 16 respectively. One advantage of using infrared as a medium is frequency reuse. Walls 13 are essentially opaque to infrared transmission. Thus, IR transmissions in one room do not interfere with IR transmissions in another. Individual rooms 11 are termed communication "cells" because of this effective partitioning. This useful property allows the reuse of the IR bandwidth for each cell in the workplace. It will be appreciated that the use of IR as a medium of wireless communication is well known in the art.

A similar communications partitioning is possible with a single radio frequency if the "near field" components produced by an antenna are used to couple the mobile units to the network. The term "near field" describes those field components of an energized antenna that do not give rise to propagating waves. The use of near field communication is disclosed in commonly assigned U.S. patent application Ser. No. 07/984,821 entitled "Wireless Communications Using Near Field Coupling" filed Dec. 3, 1992 by Richley et al. and is hereby incorporated by reference. Although only radio and infrared transmission are employed in the presently preferred embodiment, it will be appreciated that other bands of the electromagnetic and acoustic spectrum might be suitable and that the present invention should not be limited to the use of these two particular frequencies. Additionally, it will appreciated that multiple frequencies may be employed to partition the communication space into non-interfering cells.

Tabs 26, pads 24 and boards 28 are the mobile units that connect with network through the wireless media. These devices, described above, form the core of the ubiquitous computing environment. In the preferred embodiment, tab 26 is a small stylus-based mobile computer. Tab 26 is designed to be clipped onto the belt of an employee and can be carried as a Personal Digital Assistant (PDA) throughout the workplace.

Functionally, tab 26 is a simple device. Its speed and memory capacity are very modest, thus enabling these devices to be very small and consume little power. As a result, tabs 26 are very portable. The presently preferred tab 26 is primarily used as a display terminal, allowing computer applications to be accessed by tab 26 while the application resides and executes on a remote host.

Tab 26 may also report events generated by its user in response to information displayed on its screen. These events may be triggered by pressing mechanical buttons on the tab, or by pressing a stylus against a pressure sensitive display, or by other suitable user interface mechanisms.

As a user with tab 26 moves around from communication cell to communication cell, tab 26 may be periodically disconnected from the network. Such disconnection may happen for a number of reasons, including moving the tab into a communication "dead zone" where no transceiver may maintain contact, or by a failure of the tab itself, such as the discharging of its battery, or the user powering off the tab, or the like.

When the cause of disconnection is removed, tab 26 reconnects to the network. As a part of its function, tab 26 regularly broadcasts a beacon packet without user prompting. Thus, as the user moves into communication proximity with another cell (or with the original cell at a different time), tab 26 re-establishes connection with the network through its regular broadcasts or by a user triggered packet. As will be discussed in greater detail below, all tab packets include a "tab number" which serves as the virtual address of the tab. The network uses that virtual address to reestablish connection. It will be appreciated that other schemes for maintaining regular contact with the network exist. For example, the IR transceiver could poll mobile units within its cell. The present invention should not be limited to the presently preferred method of communication handoff.

When connection is re-established, any application that was currently executing and communicating with tab 26 must maintain processing continuity with tab 26 and update its status. The present invention is concerned with the problem of maintaining processing continuity.

Figure 2A:
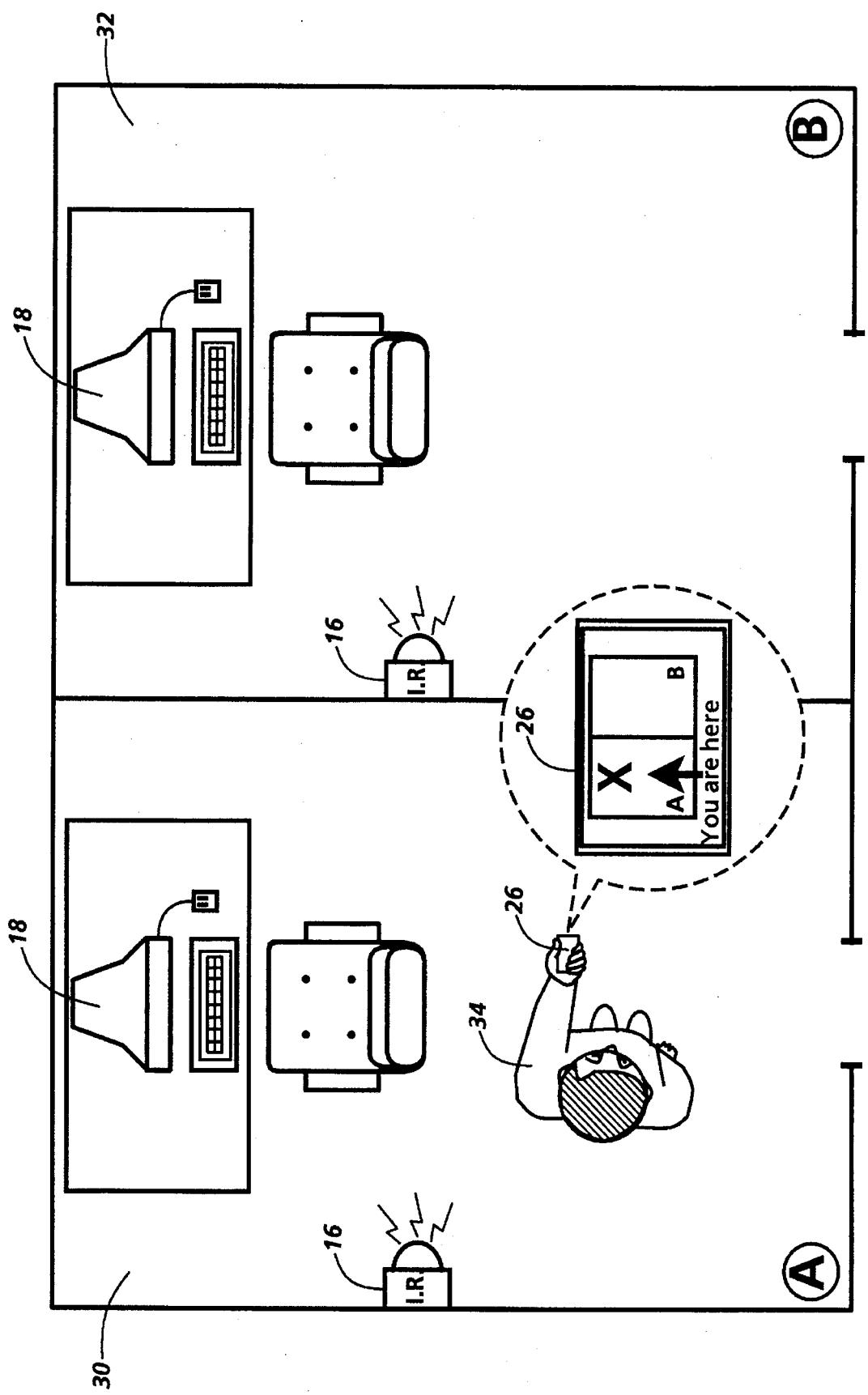
FIGS. 2A and 2B depict a typical example of a ubiquitous computing environment employing the present invention.
Figure 2B:
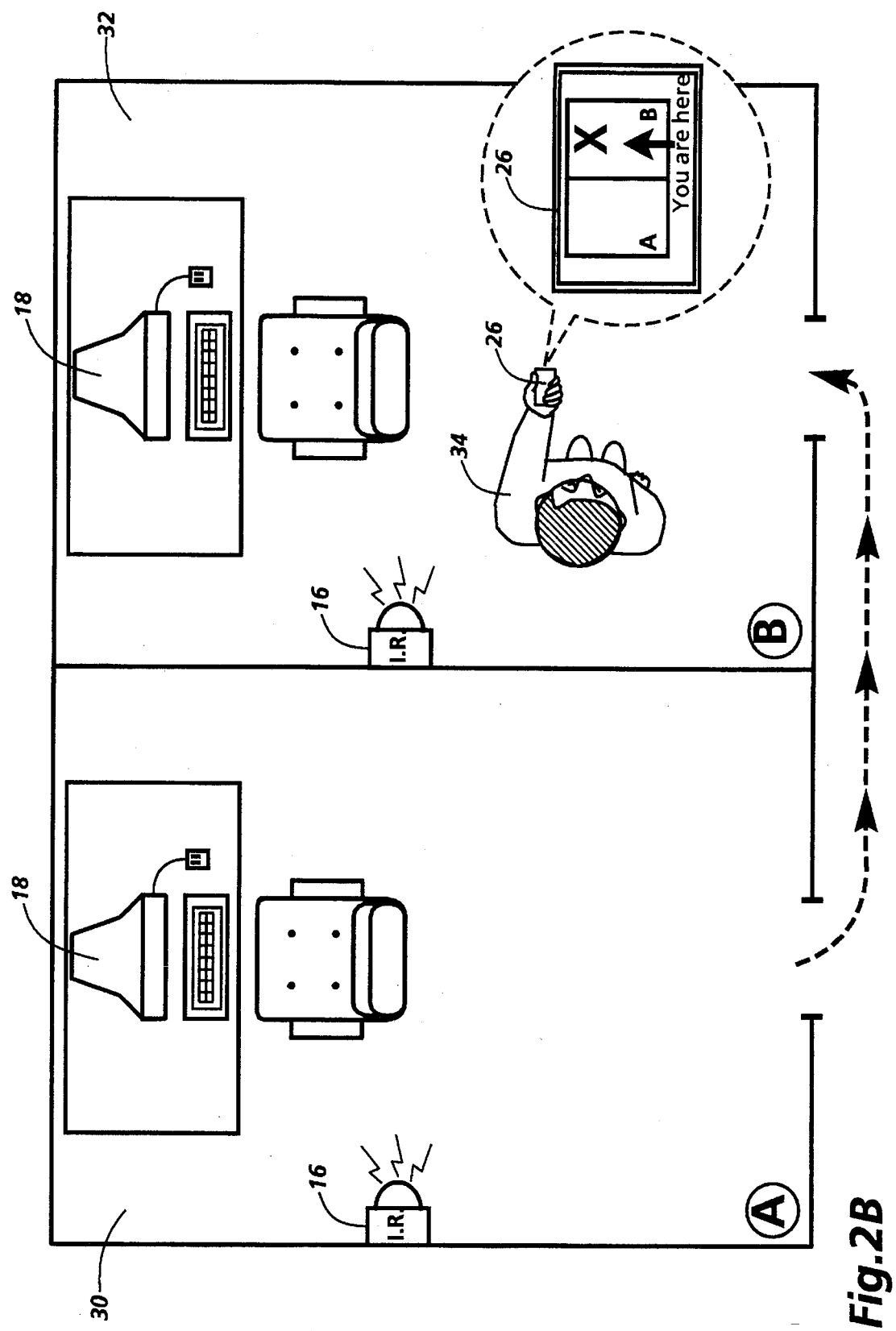

To illustrate the point, a simple example is depicted in FIGS. 2A and 2B. In FIG. 2A, user 34 is located in cell 30 and is holding tab 26. User's tab 26 is depicted as displaying the results of a "You Are Here" program which continuously shows user's location in the workplace. This program resides and executes on a remote host (not shown). While in cell 30, tab 26 is in communications and processing connection with this program through wireless links with IR transceiver 16. As user 34 leaves cell 30, the user enters a "dead zone" and network connection with tab 26 is disrupted.

The connection is not re-established until user 34 enters communication cell 32, as depicted in FIG. 2B. When tab 26 broadcasts its presence in cell 32, the new location of user 34 must be updated in the network and that information must be passed along to the locator program which continues to execute. When the information has been updated, the program, in turn, communicates its results to tab 26 through the network's IR links. It will be appreciated that the present invention is concerned with interprocess communication and continuity and the protocols to effect them in addition to methods of communication hand-off between different cells.

Figure 3:
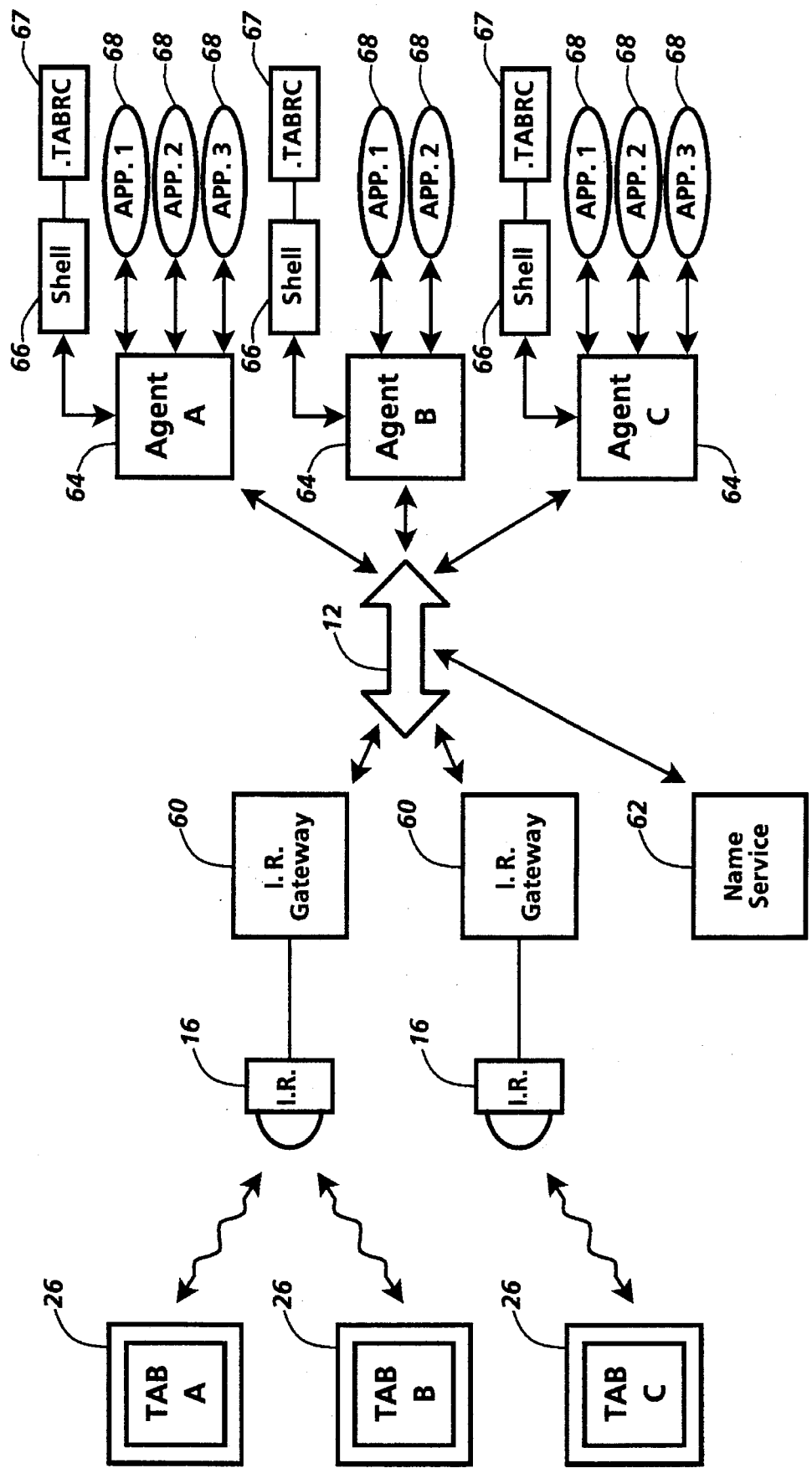
FIG. 3 is a high level diagram of the system architecture employing the techniques of the present invention.

Referring to FIG. 3, the overall architecture of the presently preferred embodiment will now be discussed. The architecture comprises a number of software components that interact with the hardware infrastructure outlined above in FIG. 1. The software components comprise IR gateway 60, name service 62, agents 64, main menu shell 66, and applications 68. The functionality of each of these components will be discussed in greater detail below.

Figure 4:
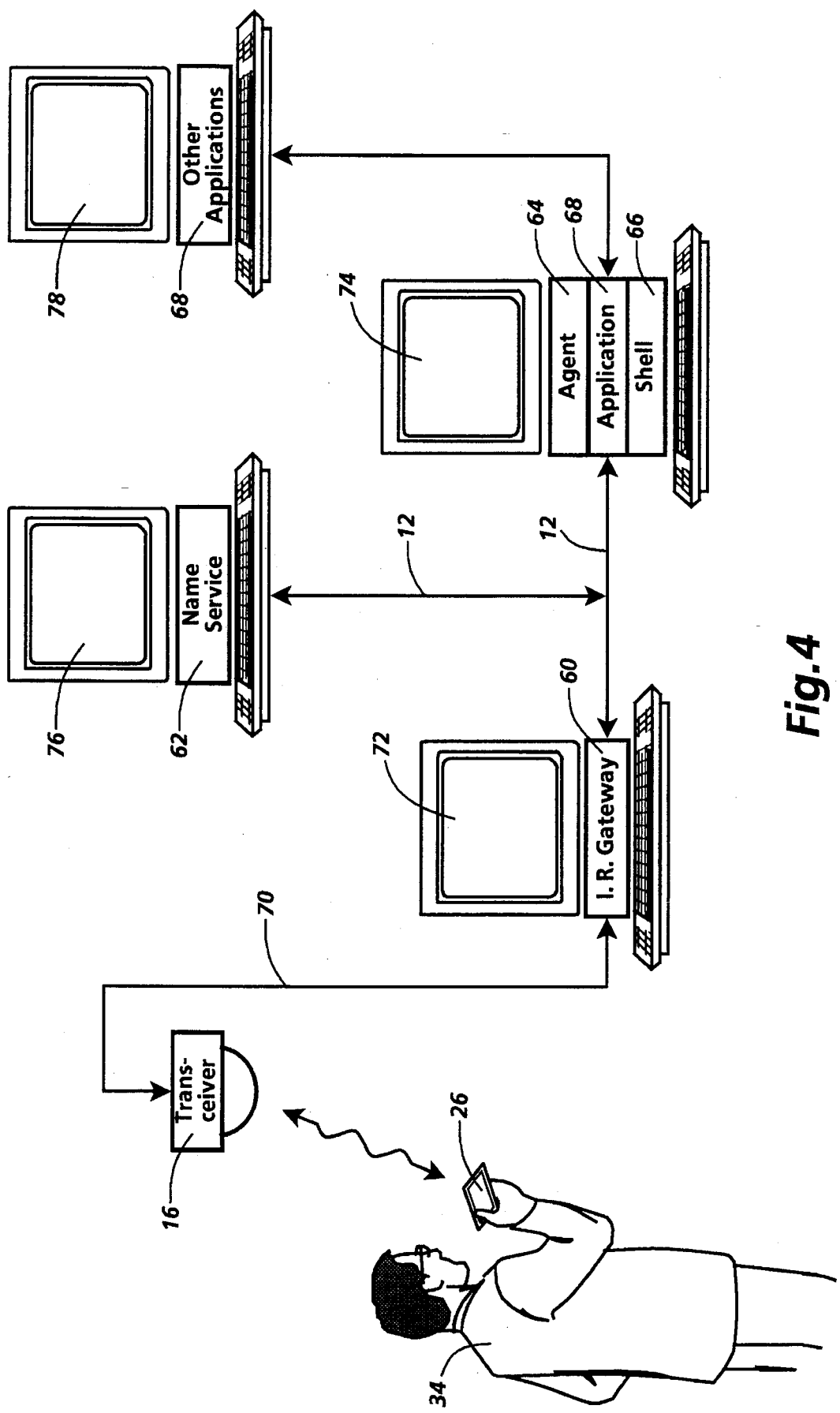
FIG. 4 shows a typical layout of the system components as might be found in an embodiment made in accordance with the principles of the present invention.

FIG. 4 shows a typical layout of the system components connected in accordance with the principles of the present invention. As shown, the various software components are distributed among different workstations 72, 74, 76, and 78 connected to the network. User 34 holds tab 26 which maintains wireless communication with the network via transceiver 16. In the presently preferred embodiment, transceiver 16 is connected to networked workstation 72 by RS-232 cable 70. It will be appreciated that other means of serial or parallel connection for the transceivers are possible and that the present invention should not be limited by the means depicted herein.

Agent 64 and shell 66 are depicted as being implemented on workstation 74 while applications 68 are implemented on workstations 74 and 78. Name service 62 is connected to the network via workstation 62. These workstations are interconnected by network backbone 12. It will be appreciated that the present invention may be implemented in a number of layouts different from that depicted in FIG. 4. For example, the software components on the system could reside on either one workstation or distributed across several workstations. It may be desirable, however, that the distribution provide a balanced load across the available workstations for reasonable system throughput.

The present invention starts from the basic premise that, for each tab registered with the network, there is a dedicated process (i.e. an "agent") to handle a variety of tasks exclusively for the tab. For example, the agent facilitates communication between applications and tabs. The agent is also responsible for scheduling and resolving contention between the authorized applications vying for the attention of the tab.

At any given time, the agent allows only one application to communicate with the tab. This requirement lessens the amount of data traffic flowing through the IR medium that would flow if all applications had an opportunity to communicate simultaneously. This is particularly important in a configuration in which the IR transmission rate is much slower than the backbone transmission rate. In the presently preferred embodiment, the backbone is a 10 Mbps Ethernet shared by both stationary and mobile devices which is stepped down to 38.4 Kbps for the serial RS-232 port. This rate is further stepped down to a 19.2 Kbps infrared transmission rate.

Additionally, the requirement of "one application at a time" communication relieves the tab from the additional processing chore of correctly storing and processing packets from two or more applications attempting to communicate concurrently. It will be appreciated that suitable modifications to the present invention could be made to support tab communications with multiple applications.

Having discussed the overall architecture and design principles of the present invention, sufficient implementation details of the various software components will now be discussed to aid the understanding of one skilled in the art. The exposition of the presently preferred embodiment will trace the communication pathway of system components from the tab, through the IR gateway and agent, to the communicating application. The name service and shell will be explained in terms of their support of this communication and processing pathway.

As was discussed above, the tab periodically beacons a broadcast packet to announce its presence to the transceiver in its range. This packet contains a "tab number" which acts as a virtual address to the tab agent. The IR gateway receives and processes this packet from the tab for forwarding to the agent associated with the sending tab.

The packet from the tab additionally contains a "sequence number". The tab increments the sequence number after each packet is sent. The purpose of the sequence number is to prevent the same packet from being acted upon two or In the presently preferred embodiment, the IR gateway exports an Ethernet based Remote Procedure Call (RPC) interface for effecting communication between the transceiver and an agent. The gateway provides an unreliable packet delivery service similar to User Datagram Protocol (UDP). The pseudocode implementing the IR gateway is provided in Table I below:

TABLE 1

INFRARED GATEWAY OPERATION

```
MAIN_PROCESS( ):
    FORK THE PACKET_FROM_TAB_PROCESS( ).
    FORK THE PACKET_FROM_AGENT_PROCESS( ).
    WAIT HERE FOR A QUIT COMMAND. /*process waits forever*/
END MAIN_PROCESS PACKET_FROM_TAB_PROCESS( ):
    FOR EACH PACKET COMING FROM THE TRANSCEIVER
        DECODE THE PACKET TO GET THE PACKET'S CHECKSUM.
        IF THE PACKET'S CHECKSUM IS BAD THEN
            THROW AWAY THE PACKET.
        ELSE
            DECODE PACKET TO GET THE TAB NUMBER.
            LOOKUP THE TAB NUMBER TO SEE IF THERE IS A
            CURRENT QUEUE FOR THIS TAB.
            IF THIS TAB HAS NO CURRENT QUEUE THEN
                ASK THE "NAME SERVICE" FOR THE ADDRESS OF THIS
                TAB'S AGENT.
                STORE THE ADDRESS OF THE TAB'S AGENT.
                CREATE A TAB QUEUE FOR THE TAB.
                FORK A NEW TAB_QUEUE( )PROCESS FOR THE TAB.
            END IF
            ADD THE ADDRESS OF THIS GATEWAY'S ADDRESS TO
            THE PACKET. /*Return Address*/
        END IF
        ADD THIS PACKET TO THE TAB'S CURRENT QUEUE.
END PACKET_FROM_TAB_PROCESS PACKET_FROM_AGENT_PROCESS( ):
    FOR EACH PACKET COMING FROM ANY AGENT
        CALCULATE A CHECKSUM FOR THE PACKET.
        ADD THE CHECKSUM TO THE END OF THE PACKET AND
        CONFORM PACKET TO CURRENT NETWORK (E.G. RPC)
        PROTOCOL.
        SEND THE PACKET TO I.R. TRANSCEIVER WHICH WILL
        BROADCAST IT.
    END FOR
END PACKET_FROM_AGENT_PROCESS TAB_QUEUE( ):
    WHILE THERE ARE PACKETS IN THE QUEUE
        USING THE TAB AGENT'S STORED ADDRESS, SEND THE
        OLDEST PACKET IN THE QUEUE TO THE TAB'S AGENT.
    END WHILE
END TAB_QUEUE
``` more times by the target application. This is important in the case where the tab transmits in a location where its packets may be picked up and transmitted by two or more IR transceivers. In such a case, multiple copies of the same packet would be received by the application.

The IR gateway is the software component responsible for effecting communication between the network and transceiver. As depicted in FIG. 4, IR gateway 60 is resident on workstation 72—the same workstation to which RS-232 cable 70 is physically connected. It is possible, however, that the transceiver could be in a different location to that of the workstation running an IR gateway providing that the distance between the transceiver and the workstation does not exceeds RS-232 specifications.

As can be seen by one skilled in the art, the main function of the gateway is to process either tab packets or agent packets. If the gateway receives a tab packet, the gateway checks the checksum to verify that the packet was transmitted error-free. It will be appreciated that numerous error detection and correction schemes are well known in the art and that the present invention should not be limited by any one particular scheme.

If the packet is error free, then the gateway decodes the packet to obtain the "tab number". The tab number is a virtual address assigned to each tab. This number is included in every message sent by the tab to the transceiver. If the gateway has a current communications "queue" set up for this tab, then the gateway appends its address to the packet and send the packet to the queue for transmission to the agent.

If, however, the gateway does not have a current queue for the tab (as would be the case when the gateway communicates with the tab for the first time), then the gateway queries the name server for the address of the tab's agent. Once the address is obtained, the gateway creates a new queue for the tab and sends an encapsulated version of the original packet to the queue.

In the event, however, that the packet received is from an agent, the gateway adds a checksum to the packet and sends the packet for broadcast by the transceiver.

All packets received by the gateway from tabs are sent to the tab's agent. In general, an agent provides the necessary interface for all communications between its associated tab and its authorized applications. An agent schedules and resolves contention between the various applications vying for the attention of the tab. A list of applications authorized to communicate with the tab is maintained by the shell in a file accessible to the agent, called "tabrc" in the presently preferred embodiment. The pseudocode implementing an agent is given below in Table 2:

TABLE 2

AGENT OPERATION

```
MAIN_PROCESS( ):
    REGISTER THE ADDRESS OF AGENT WITH THE "NAME
    SERVICE" ON BOOT UP.
    FORK THE PACKET_FROM_APPLICATION_PROCESS( ).
    FORK THE PACKET_FROM_GATEWAY_PROCESS( ).
    WAIT HERE FOR A QUIT COMMAND.      /*Main process waits here
    forever*/
END MAIN_PROCESS /* - - - - - - - packet from application handlers - - - - - - - */

PACKET_FROM_APPLICATION_PROCESS( ):
    FORK RETRY_QUEUE( ).
    FOR EACH REQUEST COMING FROM ANY APPLICATION
        DETERMINE TYPE OF REQUEST.
        IF THE PACKET IS AN APPLICATION-CONTROL TYPE
            DO APP_CONTROL_REQUEST( ).
        ELSE IF THE REQUEST IS NOT FROM THE CURRENT
        APPLICATION
            IF THE "NEW_APP_FLAG" IS SET   /* this is a new
            application*/
                IF APPLICATION I.D. IS CORRECT
                    MAKE THE THIS APPLICATION THE CURRENT
                    APPLICATION.
                END IF
                SET NEW_APP_FLAG FALSE.
            END IF
        ELSE IF REQUEST IS FROM CURRENT APPLICATION
            SEND_PACKET_TO_TAB( ).
        ELSE
            DROP PACKET.  /*assumes that only a single application is
            communicating with the tab at a time*/
        END IF
    END FOR
END PACKET_FROM_APPLICATION_PROCESS APP_CONTROL_REQUEST( ):
    DECODE THE PACKET TO DETERMINE THE SENDER
    APPLICATION AND THE TARGET OF THE REQUEST.
    IF THE SENDER IS NOT THE SHELL AND THE TARGET OF THE
    REQUEST AND THE TARGET IS NOT THE SENDER
        RETURN AN ERROR.
    END IF
    IF PACKET IS A "START_NEW_APP" EVENT      /* user wants to
    start new application*/
        GET THE NEW APPLICATION I.D. FROM THE REQUEST
        TARGET.
        FORK A NEW APPLICATION_QUEUE( ) FOR THIS
        APPLICATION.
        SET THE "NEW_APP_FLAG" TO TRUE.
    ELSE IF "RESTART_APP" EVENT         /* user wants to restart
    background app*/
        SET THE NEW APPLICATION TO BE THE TARGET
        APPLICATION.
    ELSE IF PACKET IS "QUIT_EVENT"      /* app wants to go into
    background*/
        SEND QUIT TO TARGET APPLICATION.
        SET THE CURRENT APPLICATION TO THE SHELL.
        SEND "RESUME_EVENT" TO THE SHELL.
    ELSE IF "KILL_APP" EVENT
        SEND "EXIT PROGRAM" EVENT TO THE TARGET
```

TABLE 2-continued

AGENT OPERATION

APPLICATION.
       REMOVE APPLICATION'S ADDRESS FROM APPLICATION
       TABLE.
       KILL THE TARGET APPLICATION'S APPLICATION_QUEUE( ).
    END IF
END APP_CONTROL_REQUEST

SEND_PACKET_TO_TAB( ):
    IF "ONE_PACKET_AT_A_TIME_LOCK" NOT SET THEN
       SET "ONE_PACKET_AT_A_TIME_LOCK".
       GET ADDRESS OF THE TAB'S CURRENT GATEWAY FROM
       CACHE.
       SEND THE PACKET TO THE CURRENT APPLICATION'S
       RETRY QUEUE.
       WAIT FOR ACK.
    END IF
END SEND_PACKET_TO_TAB

RETRY_QUEUE( ):
    SET THE RETRY TIMER TO A VERY SHORT TIME VALUE.
    WHILE THERE ARE PACKETS IN THE RETRY QUEUE:
       IF THE TIMER HAS TIMED OUT (E.G. NO ACK HAS BEEN
       RECEIVED)
           STORE THE PACKET'S APPLICATION.
           RESEND THE OLDEST PACKET TO THE CURRENT
           GATEWAY ADDRESS.
           ADJUST THE RETRY TIMER (USUALLY MAKING IT
           LONGER).
           RESET THE TIMER
       END IF
    END WHILE
END RETRY_QUEUE

/* - - - - - - - - - - - - - packets to application handlers - - - - - - - - - - - - - - - - - - - - - - - - */

PACKET_FROM_GATEWAY_PROCESS( ):
    FOR EACH PACKET COMING FROM ANY GATEWAY
       GET THE SEQUENCE NUMBER OF THE PACKET.
       IF THE SEQUENCE NUMBER EQUALS THE OLD_SEQUENCE
       NUMBER
           DROP THE PACKET.
           CONTINUE.
       ELSE
           OLD_SEQUENCE NUMBER = THIS SEQUENCE NUMBER.
       END IF
       GET THE RETURN ADDRESS OF THE SENDING I.R.
       GATEWAY.
       STORE THE RETURN ADDRESS OF THE I.R. GATEWAY. /     *
       current tab location*/
       DETERMINE THE TYPE OF PACKET.
       IF THE PACKET IS AN "ACK" PACKET
           DO_ACK( ).      /*response to previous message*/
       ELSE IF THE PACKET IS AN "ENTERING LOCAL MODE"
       PACKET
           SET THE "LOCAL MODE FLAG" TRUE.
       ELSE IF THE PACKET IS A "LEAVING LOCAL MODE" PACKET
           SET THE "LOCAL MODE FLAG" FALSE.
       ELSE
           GET THE HANDLE OF THE CURRENT APPLICATION.
           SEND PACKET TO THE CURRENT APPLICATION'S QUEUE.
       END IF
    END FOR
END PACKET_FROM_GATEWAY_PROCESS APPLICATION_QUEUE( ):
    WHILE THERE ARE PACKETS IN THE QUEUE
       SEND THE OLDEST PACKET TO THE CURRENT
       APPLICATION.
    END WHILE
END APPLICATION_QUEUE DO_ACK( ):
    IF "LOCAL MODE FLAG" = TRUE    /*ACKs don't count in local
    mode*/
       RETURN.
    ELSE
       SEND ACK TO APPLICATIONS'S RETRY BUFFER.

TABLE 2-continued

AGENT OPERATION

REMOVE THE PACKET FROM THE RETRY BUFFER.
UNSET THE "ONE_PACKET_AT_A_TIME" LOCK.
SEND THE ACK PACKET TO THE CURRENT
APPLICATION_QUEUEU.
    END IF
END DO_ACK

Upon start up, an agent registers its address with the name service so that gateways and other entities may communicate with the agent and, thus, its associated tab. Once running, an agent waits to process packets from either applications or gateways. Packets arriving from gateways originated from the agent's associated tab.

In processing packets from applications, the agent maintains a "retry queue" and "retry timer". The purpose of the queue and the timer is to buffer packets from an application until the receiving tab has sent back a valid acknowledgment (i.e. "ACK"). If the timer times out before receiving a valid ACK, the agent will resend the stored packet and reset the timer. In most cases, the time to which the retry timer is reset is longer than the previous time. Exceptions to this general rule arise when the time is extended up to a maximum time. Likewise, if the agent determines that its tab is in "local mode" (that is, the tab is receiving but not processing IR packets), then the retry time will actually be decreased. When any packet arrives from the tab, however, the retry timer is set to its original setting.

An application request may be an application control or send message. An application control message may either start a new application, restart an application running in the background, or it may kill an application. If a request starts a new application, a new "application queue" is created for the purpose of buffering packets destined for the application. This new, separate queue protects against the possibility of deadlock that might occur if the new application "misbehaves".

The application control operates on a supplied "target" application. Only the shell may start or restart other than themselves. Only the shell may kill an application other than itself.

A packet from an application may be from either the "current" application or from a new application. If the packet is from a current application, then the packet is sent to the retry queue. The agent appends the address of the gateway to the packet for proper handling. The address of the gateway is obtained from the last packet received from a gateway. The packet is stored in the retry queue until a valid ACK from the tab is received. Once received, the packet is then removed from the queue.

A packet sent from a new application will contain a new "application ID". As will be seen below, the shell creates a unique ID number upon starting a new application. This ID number is sent to both the agent and the new application. The agent, upon receipt of this new ID, sets its "new application flag" to true. The agent additionally creates a new application queue for the application. When the first packet from the new application is received by the agent, the agent checks its stored ID number against the ID number in this packet. If both ID numbers match, then the agent sets this new application as the current application. The use of application ID numbers in this fashion provides a level of security for the user.

A packet received from a gateway is either an ACK, an indication of entering or leaving "local mode", a beacon, or a packet from the tab to an application. As discussed above, the address of the gateway is stored for future communication with the tab. If the packet is an ACK from the tab while not in local mode, the ACK acknowledges valid receipt of an application's packet. The acknowledged packet is then removed from the retry queue. If the packet is addressed to an application, that packet is forwarded to that application's queue.

All applications read events from their queue, process these events and respond by sending the tab's agent events. To effect this, all applications run a similar main process that invokes their specific application code. The pseudo code implementing this main process is given below in Table 3;

TABLE 3

APPLICATION OPERATION

MAIN_PROCESS( ):
    APPLICATION IS BOOTED UP BY THE SHELL.
    SHELL GIVES THE APPLICATION AN APPLICATION I.D..
    SHELL GIVES THE APPLICATION THE ADDRESS OF THE
    AGENT.
    APPLICATION CONNECTS TO AGENT WITH THE APPLICATION
    I.D..
    FORK PACKET_FROM_AGENT_PROCESS( ).
    WAIT HERE FOR QUIT COMMAND.
END MAIN_PROCESS

PACKET_FROM_AGENT_PROCESS( ):    /* NOTE: Agent sends only one packet at a time */
    FOR EACH RECEIVED PACKET FROM THE AGENT
        IF PACKET = PEN_EVENT
            DO_PEN( ).
        ELSE IF PACKET = BUTTON_EVENT TABLE 3-continued

APPLICATION OPERATION

```
            DO_BUTTON( ).
        ELSE IF PACKET = REDRAW_EVENT
            DO_REDRAW( ).
        END IF
    END FOR
END PACKET_FROM_AGENT_PROCESS

DO_PEN( ):
    GET THE X,Y POSITION OF THE PEN FROM THE PEN_EVENT.
    EVENT_TO_SEND = DO_APPLICATION_CODE(X,Y).              /*execute
    specific application code here */
    SEND_TAB_REQUEST(EVENT_TO_SEND).                       /* send response
    to Tab */
END DO_PEN DO_BUTTON( ):
    GET BUTTON POSITION FROM THE BUTTON_EVENT.
    EVENT_TO_SEND = DO_APPLICATION_CODE(BUTTONS).
    /* execute specific application code here */
    SEND_TAB_REQUEST(EVENT_TO_SEND)                        /* send response to
 Tab */
END DO_BUTTON DO_REDRAW( ):
    EVENT_TO_SEND = DO_APPLICATION_REDRAW_CODE( ).
    /* execute specific application code goes here */
    SEND_TAB_REQUEST(EVENT_TO_SEND).                       /* send response
    to Tab */
END DO_REDRAW SEND_TAB_REQUEST(EVENT):
    CONVERT THE EVENT INTO A PACKET.
    USING THE CURRENT AGENT ADDRESS SEND THE PACKET TO
    THE AGENT.
    WAIT FOR THE "ACK" FROM AGENT.                         /* wait here until ACK
    arrives */
END SEND_TAB_REQUEST
```

After booted up by the shell, the application connects with the agent using the application ID provided by the shell. The application then waits for events from the agent. In the presently preferred embodiment, the agent provides only one event at a time to the application. The application processes each event depending upon the type of event given and the state of the application. The state of the application is dependent, in turn, upon its specific code and previous events.

For example, the application determines whether the packet is a pen event or a button event originating from the tab, or a redraw event originating from the agent. Both pen events and button events invoke processes to interpret and handle these requests that are initiated by the user. For example, if the user has touched an icon on the tab screen, the x-y coordinates of the touched icon are sent in a pen event packet to the agent. These coordinates are deciphered and interpreted as a request to start the process represented visually by the icon at those coordinates.

These processes may generate messages to be sent to the tab. Such messages may be to place graphics on the tab screen or to beep the tab's speaker. The application sends one such request to the agent at a time and waits for an ACK from the agent before continuing.

The shell, in the presently preferred embodiment, operates as a "privileged" application. That is, while the main loop of the shell is similar to the main loop of an application, the shell may perform additional functions that ordinary applications do not. For example, the shell schedules applications by either starting new applications, restarting suspended applications, or providing a login capability for a new user to control the tab. The pseudo code for the shell is given below in Table 4:

TABLE 4

SHELL OPERATION

```
MAIN_LOOP( ):
    THE SHELL IS BOOTED UP BY THE AGENT.
    THE AGENT'S ADDRESS IS STORED.
    THE SHELL RECEIVES PRIVILEGED STATUS FROM THE AGENT.
    IF THERE IS A ".TABRC" FILE IN THE USER'S DIRECTORY
        LOAD_TABRC(.TABRC).
    ELSE
        LOAD_TABRC(GENERIC_TABRC).                         /* use a default
        TABRC */
    END IF
```

TABLE 4-continued
SHELL OPERATION

```
        FORK PACKET_FROM_AGENT_PROCESS( ).
        DISPLAY_MAIN_MENU( ).
END MAIN_LOOP

PACKET_FROM_AGENT_PROCESS( ):                       /* Agent sends only one
packet at a time */
     FOR EACH RECEIVED PACKET FROM THE AGENT IF PACKET = PEN_EVENT
            DO_PEN( ).
        ELSE IF PACKET = BUTTON_EVENT
            DO_BUTTON( ).
        ELSE IF PACKET = REDRAW_EVENT
            DO_REDRAW( ).
        END IF
     END FOR
END PACKET_FROM_AGENT_PROCESS LOAD_TABRC(TABRC):
     INPUT THE TABRC FILE.                          /* .TABRC is a user created file */
     CREATE APPLICATION DATABASE OF ICONS AND
     APPLICATION NAMES.
     SET THE "DISPLAY PAGE" TO THE FIRST PAGE OF THE MAIN
     MENU.
END LOAD_TABRC DO_PEN( ):
     GET THE X,Y POSITIONS OF THE PEN FROM THE PEN_EVENT.
     EVENT_TO_SEND = DO_AGENT_CODE(X,Y).            /* agent code
     goes here */
     SEND_TAB_REQUEST(EVENT_TO_SEND).               /* send response
     to Tab */
END DO_PEN DO_BUTTON( ):
     GET BUTTON POSITION FROM THE BUTTON_EVENT.
     EVENT_TO_SEND = DO_AGENT_CODE(BUTTONS).        /  *
     agent code goes here */
     SEND_TAB_REQUEST(EVENT_TO_SEND).               /* send response
     to Tab */
END DO_BUTTON DO_REDRAW( ):
     EVENT_TO_SEND = DO_AGENT_REDRAW_CODE( ).       /  *
     agent code goes here */
     ACK = SEND_TAB_REQUEST(EVENT_TO_SEND).         /  *
     send response to Tab */
END DO_REDRAW DO_AGENT_CODE(EVENT):
     IF AN APPLICATION ICON WAS SELECTED
        EVENT_TO_SEND = DO_APPLICATION( ).          /* start up an
        application */
     ELSE IF THE LOG_OUT ICON WAS SELECTED
        EVENT_TO_SEND = DO_LOGOUT( ).               /* logout */
     ELSE IF THE LOG_IN ICON WAS SELECTED
        EVENT_TO_SEND = DO_LOGIN( ).                /* log in as new owner
        */
     ELSE IF A KILL_APPLICATION EVENT WAS SENT
        EVENT_TO_SEND = DO_KILL( ).                 /* kill chosen application
        */
     ELSE IF A NEW PAGE ICON WAS SELECTED
        EVENT_TO_SEND = DO_NEW_PAGE( ).             /* go to a new
        page of menu */
     END IF
     RETURN EVENT_TO_SEND.
END DO_AGENT_CODE DO_APPLICATION( ):
     GET THE APPLICATION'S ADDRESS FROM THE TABRC
     DATABASE.
     IF THE APPLICATION IS RUNNING IN BACKGROUND MODE
        SEND THE AGENT A PACKET MAKING NEW APPLICATION
        THE CURRENT APPLICATION.
     ELSE IF APPLICATION IS NOT RUNNING
        BOOT UP THE NEW APPLICATION.
        SEND THE AGENT THE SAME APPLICATION I.D..
```

TABLE 4-continued

SHELL OPERATION

```
        TELL THE AGENT TO CONNECT TO THE NEW APPLICATION.
        SEND THE APPLICATION AN APPLICATION I.D..
        SEND THE APPLICATION THE ADDRESS OF THE AGENT.
    END IF
    UPDATE THE DATABASE WITH THE NEW CURRENT
    APPLICATION
    UPDATE THE DATABASE INDICATING THAT THE APPLICATION
    HAS BEEN BOOTED UP.
    RETURN FLASH_THE_ICON.
END DO_APPLICATION

DO_LOGOUT( ):
    QUIT THIS SHELL.
END DO_LOGOUT

DO_LOGIN( ):
    ASK THE USER FOR THE NEW USER'S NAME.
    ASK THE USER FOR THEIR PASSWORD.
    IF PASSWORD IS CORRECT
        BOOT UP NEW SHELL WITH NEW USER.
        QUIT THIS SHELL.
    ELSE
        CONTINUE AS OLD USER.
    END IF
    RETURN FLASH_THE_ICON.
END DO_LOGIN

DO_KILL( ):
    SENT KILL REQUEST TO THE AGENT.
    UPDATE THE DATABASE INDICATING APPLICATION IS NOT
    RUNNING.
    RETURN FLASH_THE_ICON.
END DO_KILL

DO_REDRAW( ):
    DETERMINE WHAT PAGE OF THE MENU TO WITHDRAW.
    COMPOSE THE BITMAP OF THE PAGE USING THE ICONS.
    RETURN BITMAP IMAGE OF THE PAGE FOR DISPLAY.
END DO_REDRAW
DO_NEW_PAGE( ):
    FROM ICON SELECTION DETERMINE THE NEW PAGE.
    SET THE DISPLAY PAGE TO THE NEW PAGE.
    COMPOSE THE BITMAP OF THE PAGE USING THE ICONS.
    RETURN BITMAP IMAGE OF THE PAGE FOR DISPLAY.
END DO_NEW_PAGE

SEND_TAB_REQUEST(EVENT):
    CONVERT THE EVENT INTO A PACKET
    USING THE CURRENT AGENT ADDRESS SEND THE PACKET TO
    THE AGENT.
    WAIT FOR THE "ACK" FROM AGENT.              /* wait here until ACK
    arrives */
END SEND_TAB_REQUEST
```

As is seen from the main loop of the shell, the shell is originally booted up by the agent and the address of the agent is passed to the shell and stored. The shell loads the computing environment of the user by reading a text file, called .tabrc, which contains a listing of applications authorized by the user. The .tabrc also contains the names of bit-mapped files to be used as icons for the applications. These icons are displayed on the tab itself. If there is no tabrc file found in the user's home directory, then a generic .tabrc is loaded.

In summary, it will be appreciated that the present invention provides a mechanism for providing processing continuity between mobile tabs and applications. This continuity is provided, in part, by the dedicated agent process that supplies the communication interface between its associated tab and applications. At all times, the agent places every packet sent to the tab in its retry queue. The packet is removed from the queue only when a valid acknowledgement is received from the tab. Thus, when a disruption in the communication pathway to the tab occurs, intermediate processing results are eventually sent to the tab.

The present invention also provides a level of security for end users. Only applications that are registered with the shell may "talk" to the tab. The agent enforces this rule by comparing the application ID sent to it by the shell against the ID number presented by the application.

The present invention additionally provides an easy method of updating the location of its mobile unit. The tab's agent always stores the gateway's address from the last packet it "sees" from the tab. The advantage of keeping the agent informed is that no application needs to "know" where the tab is—applications need only talk to the agent. Another advantage is that location information is distributed across the agents in local storage—for most communications, a query to a global name service is not needed.

What is claimed:

1. A system for maintaining processing continuity in a network having a network accessible application and a mobile unit intermittently connected through wireless links to the network, the system comprising a mobile unit having a mobile transceiver for wireless communication with the network, a stationary transceiver connected to the network for wireless communication with the mobile unit, a gateway for controlling the stationary transceiver, the gateway being connected to the network, a stationary processor connected to the gateway and configured to support access to the network accessible application from the mobile unit, and an agent dedicated to communication and processing control of the mobile unit, the agent running on the stationary processor and connected to the gateway for handling communications between the mobile unit and the network accessible application, with the agent configured to hold data received from the network accessible application for transmission to the mobile unit when the mobile unit is in wireless communication with the network.

2. The system of claim 1, wherein the stationary processor runs both the network accessible application and the agent.

3. The system of claim 1, wherein the stationary processor runs the agent and is connected by the network to a second stationary processor that runs the network accessible application.

4. The system of claim 1, wherein the agent further comprises a module for preventing communication between an unauthorized network accessible application and the mobile unit.

5. The system of claim 1, wherein the agent further comprises a module for scheduling communication access between a plurality of network accessible applications and the mobile unit.

6. The system of claim 1, wherein the agent further comprises a module for resolving contentious access requests between a plurality of network accessible applications and the mobile unit.

7. A method for maintaining processing continuity in a network having a network accessible application and a mobile unit intermittently connected through wireless links to the network, the method comprising the steps of maintaining at least intermittent communication between a gateway connected to the network and a mobile unit having a transceiver for wireless communication with the gateway, providing a stationary processor connected to the gateway and configured to support access to the network accessible application from the mobile unit, and running an agent on the stationary processor, the agent being dedicated to communication and processing control of the mobile unit, with the agent connected to the gateway for handling communications between the mobile unit and the network accessible application, and the agent being configured to hold data received from the network accessible application for transmission to the mobile unit when the mobile unit is in wireless communication with the network.

\* \* \* \* \*